Aug. 17, 1948.  H. F. SCHMIDT  2,447,095
AIRPLANE ANTI-ICING SYSTEM
Filed Dec. 30, 1944  5 Sheets-Sheet 1
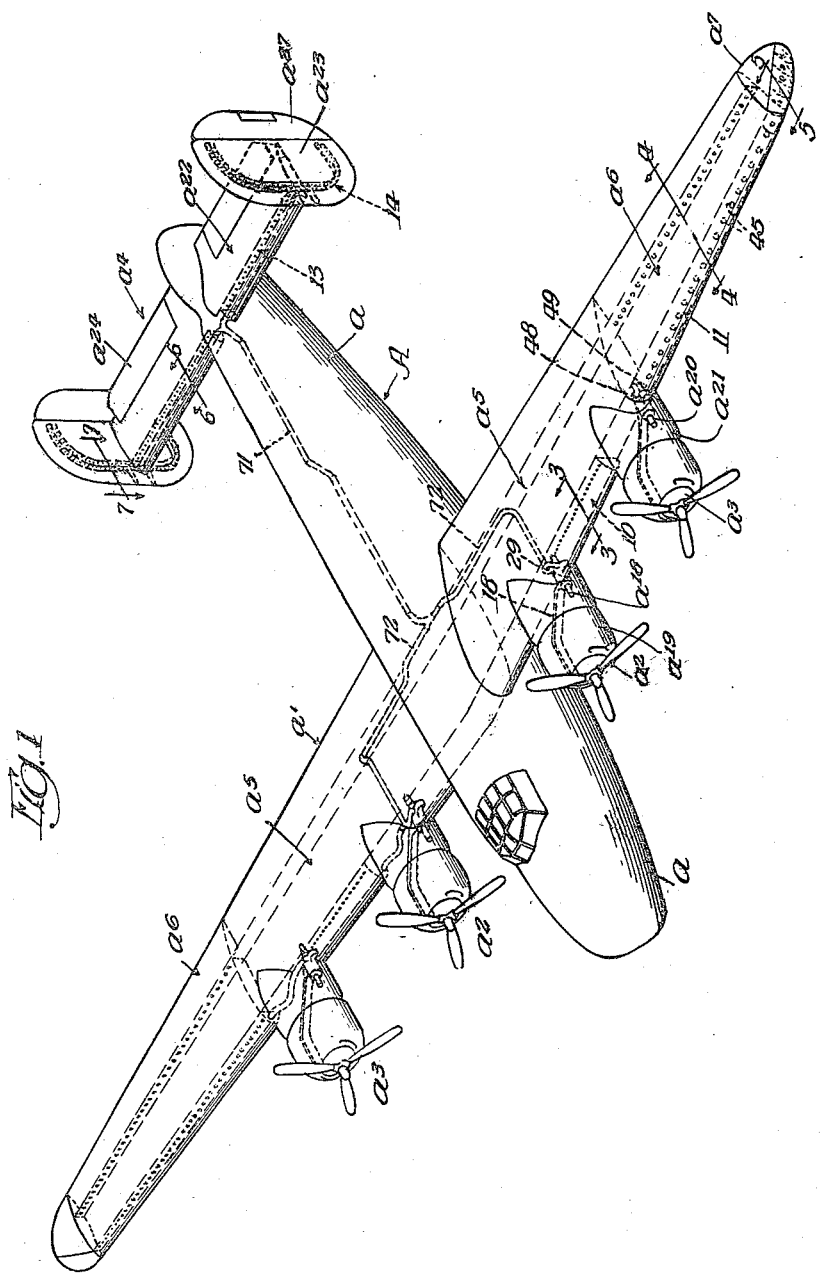
INVENTOR
Howard F. Schmidt
BY Fred Gerlach
ATTORNEY

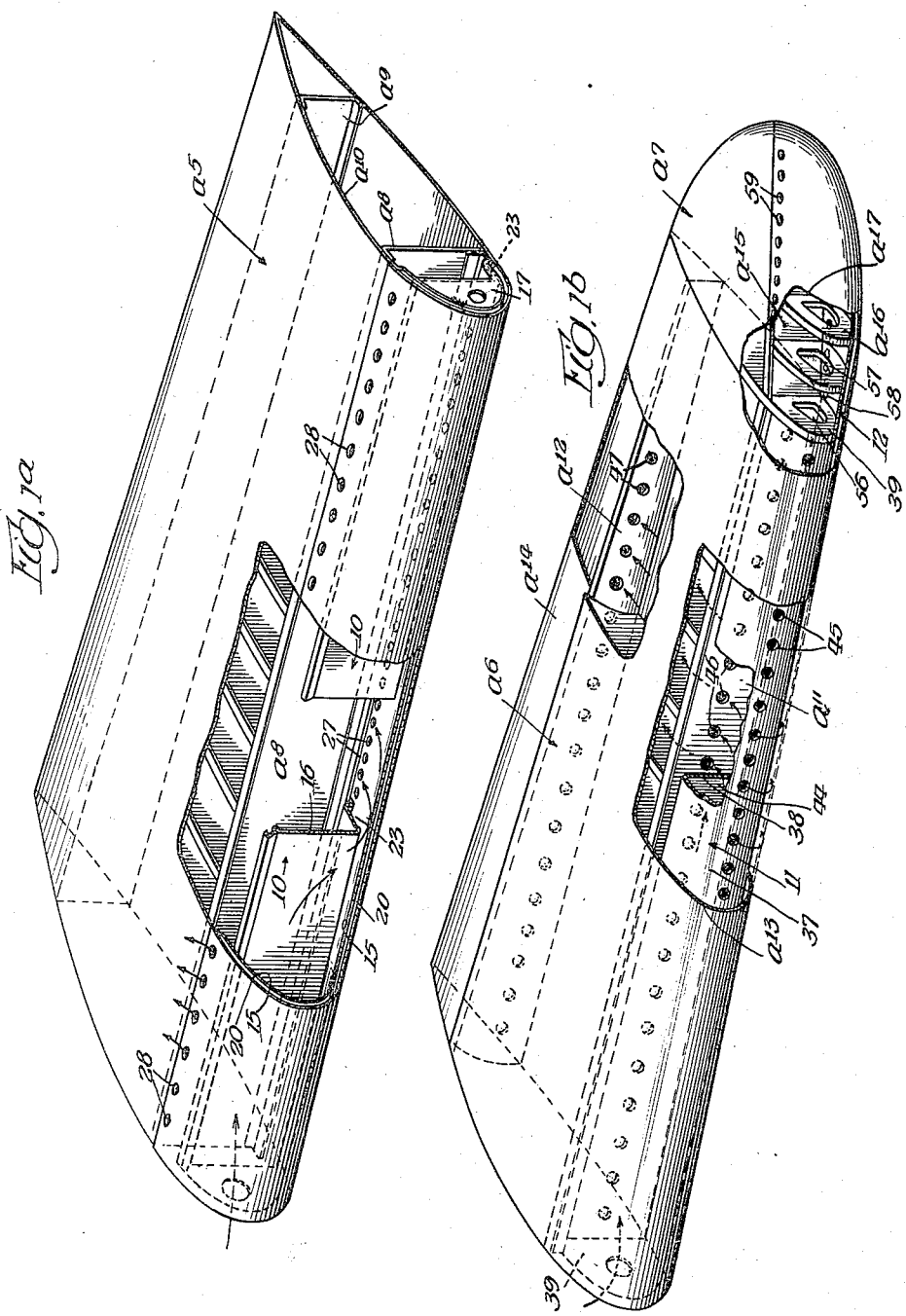

Aug. 17, 1948.   H. F. SCHMIDT   2,447,095
AIRPLANE ANTI-ICING SYSTEM
Filed Dec. 30, 1944   5 Sheets-Sheet 3
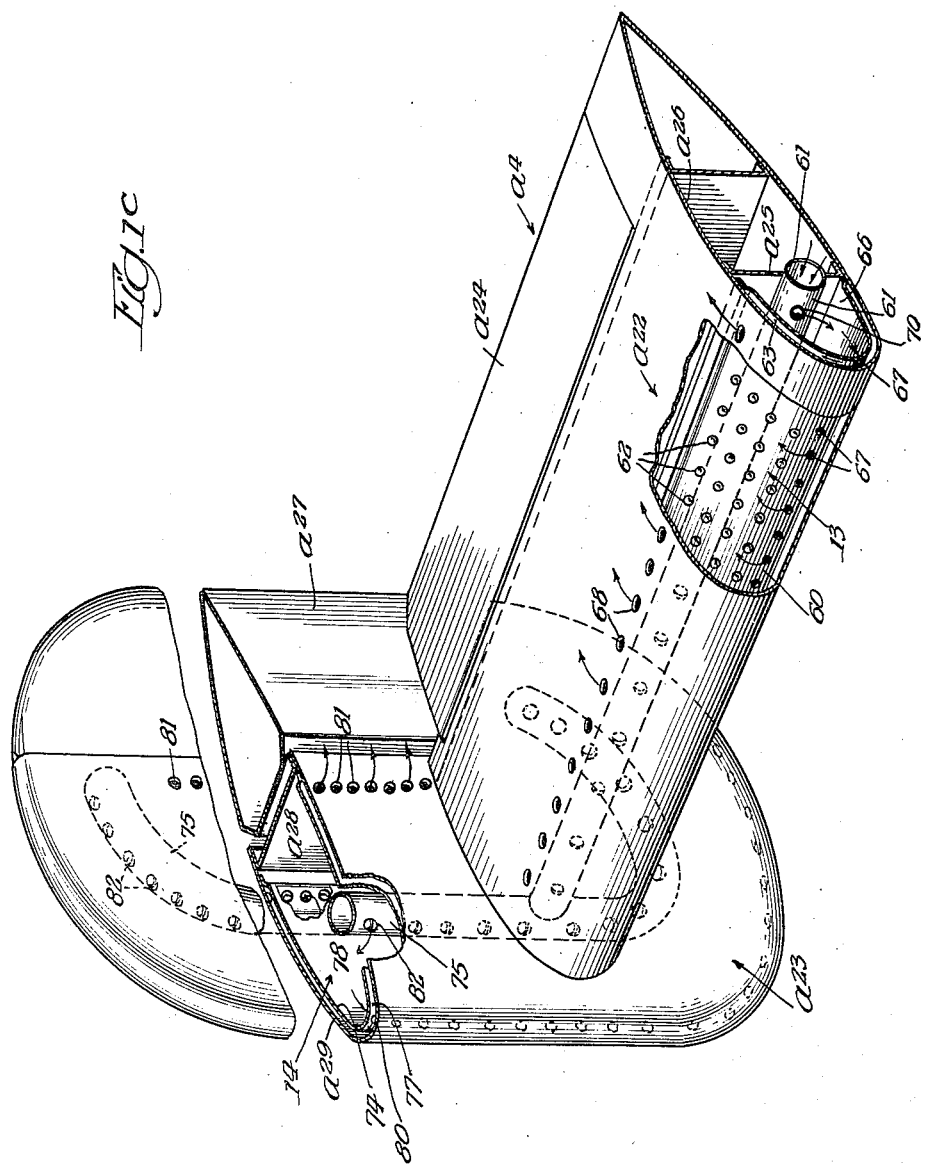
Inventor
Howard F. Schmidt
By Fred Gerlach
Atty.

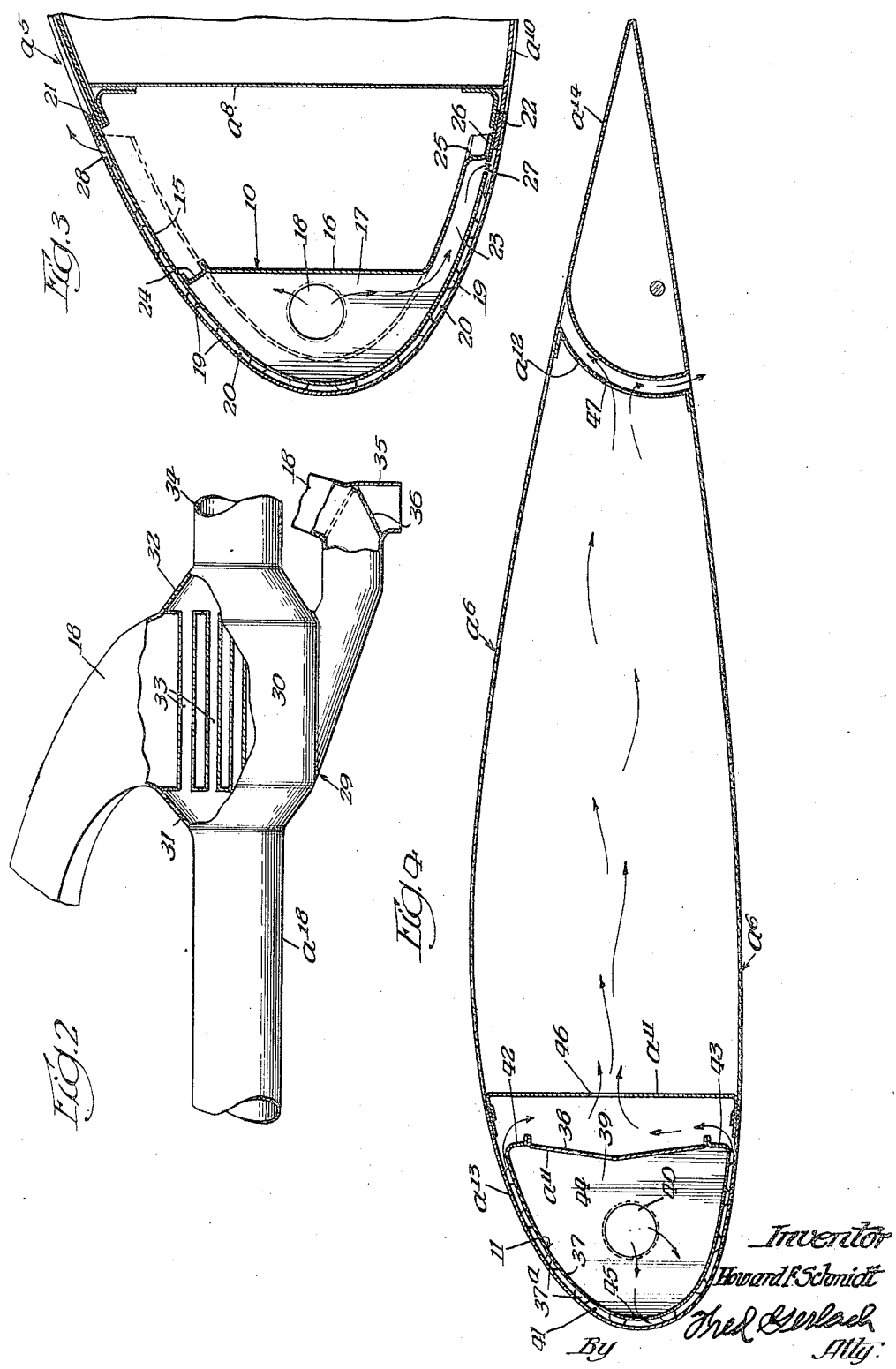

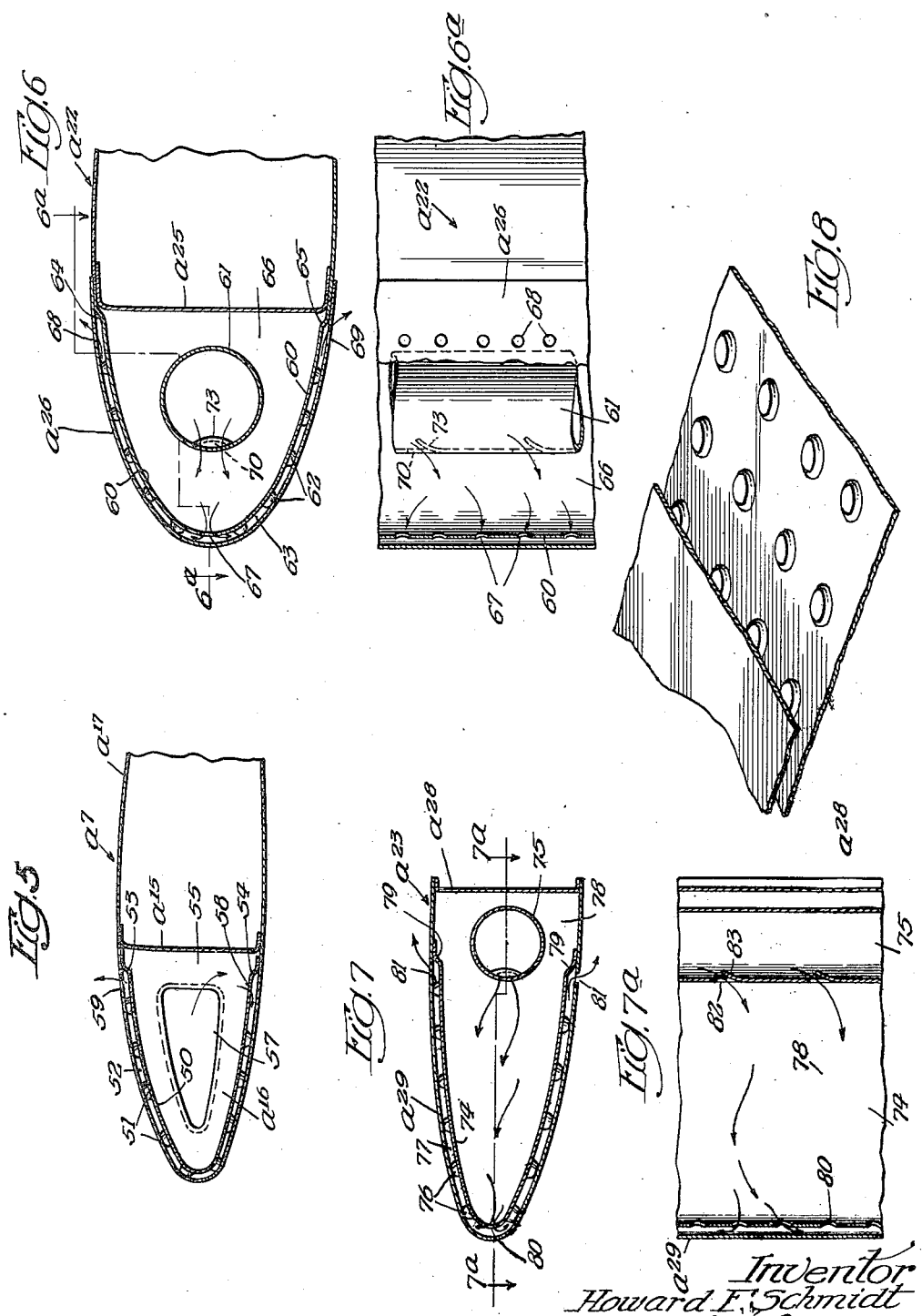

Patented Aug. 17, 1948

2,447,095

UNITED STATES PATENT OFFICE 2,447,095

AIRPLANE ANTI-ICING SYSTEM

Howard F. Schmidt, San Diego, Calif., assignor to Consolidated Vultee Aircraft Corporation, San Diego, Calif., a corporation of Delaware Application December 30, 1944, Serial No. 570,547

1 Claim. (Cl. 244—134)

The present invention relates generally to anti-icing systems for airplanes. More particularly the invention relates to that type of airplane anti-icing system which serves either to prevent the formation of ice on, or to effect removal of ice from, the leading edges of the main airfoils of the airplane, such, for example, as the wing sections, the ailerons, and the horizontal and vertical stabilizers, and is energized or actuated by air which is heated by the engine exhaust gases and is selectively delivered under valve control against the interior surfaces of such edges.

One object of the invention is to provide an airplane anti-icing system of this type which is an improvement upon, and has certain inherent advantages over, previously designed systems for the same purpose and is characterized by the fact that it is highly efficient and comparatively simple in construction or design.

Another object of the invention is the provision of an airplane anti-icing system comprising inner skin parts which are of U-shaped cross section, fit within, and are spaced from, the leading edges of the wing sections and the horizontal and vertical stabilizers and form with such edges comparatively thin U-shaped compartments through which the heated air is circulated.

Another object of the invention is to provide an airplane anti-icing system of the last mentioned character in which the inner skin parts of U-shaped cross section have outwardly extending spaced apart protuberances for spacing them from the leading edges of the wing sections and the horizontal and vertical stabilizers and serve not only to provide U-shaped compartments for the heated air, but also to reenforce such edges.

A further object of the invention is to provide an airplane anti-icing system embodying simple and novel means for directing heated air against the leading edges of the ailerons of the airplane for anti-icing purposes.

A still further object of the invention is to provide an airplane anti-icing system which is generally of new and improved construction and effectively and quickly fulfills its intended purpose.

Other objects of the invention and the various advantages and characteristics of the present anti-icing system will be appartent from a consideration of the following detailed description.

The invention consists in the several novel features which are hereinafter set forth and are more particularly defined by the claim at the conclusion hereof.

In the drawings which accompany and form a part of this specification or disclosure and in which like letters and numerals of reference denote corresponding parts throughout the several views:

Figure 1 is a perspective view of a single wing 4-engine type airplane having applied thereto an anti-icing system embodying the invention;

Figure 1a is a fragmentary perspective view of one of the inner sections of the wing of the airplane;

Figure 1b is a fragmentary perspective view of one of the outer sections of the wing and the tip that is associated therewith;

Figure 1c is a fragmentary perspective of the empennage of the airplane;

Figure 2 is a view partly in side elevation and partly in section of one of the heat exchangers which are associated with the airplane engines, respectively, and serve to heat the air for the anti-icing system by way of the engine exhaust gases;

Figure 3 is an enlarged vertical transverse section taken on the line 3—3 of Figure 1 and illustrating in detail the construction and design of the portions of the system that are associated with the inner sections of the wing of the airplane;

Figure 4 is an enlarged vertical transverse section taken on the line 4—4 of Figure 1 and illustrating in detail the construction and design of the portions of the system which are associated with the outer sections of the airplane wing and serve to prevent the accumulation of ice on, or effect removal of ice from, the leading edges of the outer wing sections and the leading edges of the ailerons of the airplane;

Figure 5 is an enlarged vertical transverse section taken on the line 5—5 of Figure 1 and showing the construction and design of the portions of the system which are associated with the tips of the wing;

Figure 6 is an enlarged vertical transverse section taken on the line 6—6 of Figure 1 and illustrating in detail the construction, arrangement and design of the portion of the system which is associated with the leading edge of the horizontal stabilizer of the airplane;

Figure 6a is a longitudinal section on the line 6a—6a of Figure 6;

Figure 7 is an enlarged horizontal section taken on the line 7—7 of Figure 1 and illustrating the construction and design of the portions of the system which are associated with the leading edges of the vertical stabilizers of the airplane;

Figure 7a is a longitudinal section on the line 7a—7a of Figure 7; and

Figure 8 is a fragmentary perspective view of one of the inner skin parts of the system.

The anti-icing system which is shown in the drawings constitutes the preferred form or embodiment of the invention and is illustrated in connection with, and as forming a part of, an airplane A. It serves as hereinafter described more in detail, as a medium for either preventing the formation of ice on, or effecting removal of ice from, the leading edges of the main airfoils of the airplane. The airplane A is of conventional or standard construction and comprises a fuselage $a$, a wing $a^1$, a pair of propeller driving inboard engines $a^2$, a pair of propeller driving outboard engines $a^3$, and an empennage $a^4$.

The fuselage $a$ of the airplane embodies a pilot's compartment at the front end thereof and has the empennage $a^4$ applied to its rear end. The wing $a^1$ constitutes the primary supporting surface or airfoil for the airplane A. It is located directly behind the pilot's compartment and comprises a pair of inner sections $a^5$, a pair of outer sections $a^6$ and a pair of tips $a^7$. The central portion of the wing $a^1$ extends through, and is fixedly secured within, the front upper portion of the fuselage $a$. The inner wing sections $a^5$ are positioned on opposite sides of, and project outwards from, the airplane fuselage $a$ and comprise front longitudinally extending spars $a^8$, rear longitudinally extending spars $a^9$, cross ribs (not shown) between the front and rear spars, and outer skins $a^{10}$ around the spars and cross ribs. The leading portions of the skins $a^{10}$ are U-shaped in cross section and form the leading edges of the inner wing sections $a^5$. The outer wing sections $a^6$ are connected to, and project outwards from, the inner wing sections $a^5$ and comprise front longitudinally extending spars $a^{11}$, rear longitudinally extending spars $a^{12}$, cross ribs (not shown) between the front and rear spars $a^{11}$ and $a^{12}$, and outer skins $a^{13}$ around said spars and cross ribs. The front spars $a^{11}$ are longitudinally aligned with the front spars $a^8$ of the inner wing sections $a^5$ and have the inner ends thereof fixedly secured to the outer ends of the spars $a^8$. The rear longitudinally extending spars $a^{12}$ are longitudinally aligned with the rear spars $a^9$ of the inner wing sections and have their inner ends suitably fixedly secured to the outer ends of said spars $a^9$. The leading portions of the skins $a^{13}$ are U-shaped in cross section and constitute the leading edges of the outer wing sections $a^6$. In addition to the parts heretofore described the outer wing sections $a^6$ comprise a pair of ailerons $a^{14}$. The latter are positioned directly behind, and are coextensive with, the rear spars $a^{12}$ and have hinges (not shown) for supporting them so that they are free to swing upwards and downwards with respect to said outer wing sections $a^6$. They are of standard or conventional construction and have the leading portions of the skins thereof transversely rounded or curved for aerodynamic purposes. The tips $a^7$ of the wing $a^1$ are connected to, and project outwards from, the outer ends of the outer wing sections $a^6$. They serve to complete the wing and embody front spars $a^{15}$, nose ribs $a^{16}$ and external skins $a^{17}$ for covering purposes. The spars $a^{15}$ are connected to the outer ends of the front spars $a^{11}$ of the outer wing sections $a^6$ and sweep or project rearwards. The nose ribs $a^{16}$ are connected to, and project forwards from, the front spars $a^{15}$ and are spaced laterally apart. The front portions of the skins $a^{17}$ are U-shaped in cross section, surround the nose ribs $a^{16}$ and constitute the leading edges of the wing tips $a^7$.

The propeller driving engines $a^2$ and $a^3$ are of the internal combustion type and serve in connection with drive of the propellers to effect forward propulsion of the airplane A. The inboard engines $a^2$ have rearwardly extending exhaust pipes $a^{18}$ and are mounted within nacelles $a^{19}$ which are fixedly connected to the inner front portions of the inner wing sections $a^5$. The propeller driving outboard engines $a^3$ have rearwardly extending exhaust pipes $a^{20}$ and are mounted within nacelles $a^{21}$ which, as shown in Figure 1, are connected to the outer front portions of the inner wing sections $a^5$.

The empennage $a^4$ of the airplane A embodies a horizontal stabilizer $a^{22}$ and a pair of vertical stabilizers $a^{23}$. The horizontal stabilizer $a^{22}$ is connected to, and projects outwards in opposite directions from, the rear upper portion of the fuselage $a$ and has a pair of vertically swinging elevators $a^{24}$ along its trailing edge. It is of airfoil cross section and embodies a front horizontally extending spar $a^{25}$, laterally spaced cross ribs (not shown) and an external skin $a^{26}$ around said front spar and cross ribs. The front portion of the skin $a^{26}$ is U-shaped in cross section and constitutes the leading edge of the horizontal stabilizer $a^{22}$. The vertical stabilizers $a^{23}$ have the central portions thereof connected to the ends of the horizontal stabilizer $a^{22}$. They carry hinged rudders $a^{27}$ at their trailing edges and embody C-shaped spars $a^{28}$ and external skins $a^{29}$. The front, upper and lower portions of the skins are of U-shaped cross section and constitute the leading edges of the vertical stabilizers $a^{23}$.

In general the anti-icing system consists of portions 10 for preventing the formation of ice on the leading edges of the inner wing sections $a^5$, portions 11 for preventing ice formation on the leading edges of the outer wing sections $a^6$ and the leading edges of the ailerons $a^{14}$, portions 12 for preventing formation of ice on the leading edges of the wing tips $a^7$, a portion 13 for preventing ice formation on the leading edge of the horizontal stabilizer $a^{22}$ of the airplane empennage $a^4$, and portions 14 for preventing formation of ice on the leading edges of the rudder carrying stabilizers $a^{23}$ at the ends of the horizontal stabilizer $a^{22}$. As hereinafter described the various portions of the system are energized or actuated by air which is heated by the engine exhaust gases.

The system portions 10 are two in number. They are associated respectively with the leading edges of the inner wing sections $a^5$, and comprise inner skin parts 15, longitudinally extending partitions 16, cross partitions 17, and air ducts 18. The inner skin parts 15 are U-shaped in cross section and fit within and extend lengthwise of the front or leading edges of the outer skins $a^{10}$ of the inner wing sections $a^5$. They are formed of sheet metal and have throughout substantially the entire area thereof integral outstruck cup-like protuberances 19. The latter have the outer portions thereof flattened and arranged in abutment with the inner surfaces of the leading edges of the outer skins $a^{10}$ of the inner wing sections, and serve to space the inner skin parts 19 from such edges so as to form therebetween thin compartments 20 of U-shaped cross section. The upper side portions of the U-shaped compartments 20 are closed by filler strips 21 which extend lengthwise of the inner wing sections $a^5$ and are interposed between, and are suitably secured to, the upper side margins of the inner skin parts 15 and the superjacent portions of the leading edges of the outer skins $a^{10}$. The lower side portions of the U-shaped compartments 20 are closed by filler strips 22 which extend lengthwise of the inner wing sections and are interposed between, and are suitably secured to, the lower side margins of the inner skin parts 15 and the subjacent portions of the leading edges of the outer skins $a^{10}$. The partitions 16 extend for the most part vertically and are disposed within the U-shaped inner skin parts 15. They are preferably formed of sheet metal and define with the inner skin parts 15 plenum chambers 23. The latter are of L-shaped cross section and receive heated air from the air ducts 18 as hereinafter described. The upper margins of the partitions 16 are connected to the upper central portions of the inner skin parts 15 by way of longitudinally extending channel bars 24. The lower margins of the partitions 16 extend rearwards and embody along the free margins thereof downwardly extending flanges 25 and rearwardly extending flanges 26. As shown in Figure 3 the flanges 26 abut against, and are secured to, the lower side margins of the inner U-shaped skin parts 15. The cross partitions 17 are connected to, and extend across, the end margins of the inner skin parts 15 and the longitudinally extending partitions 16 and serve to close the ends of the compartments 20 and the plenum chambers 23. The portions of the inner skin parts 15 that are disposed directly in front of the downwardly extending flanges 25 of the partitions 16 are each provided with a longitudinally extending series of holes 27. These holes establish communication between the lower rearwardly extending legs of the plenum chambers 23 and the lower rear portions of the U-shaped compartments 20 between the inner skin parts 15 and the leading edges of the outer skins $a^{10}$. The portions of the outer skins $a^{10}$ that are directly in front of the filler strips 21 are each provided with a longitudinally extending series of holes 28. Such holes serve to vent the upper rear portions of the compartments 20 to atmosphere. When heated air is introduced into the plenum chambers 23 via the ducts 18 it first flows downwards into the lower rearwardly extending legs of the chambers, then flows downwards through the holes 27 into the lower portions of the compartments 20, then flows upwards around the compartments 20 and is finally exhausted to atmosphere through the holes 28. During upward travel through the compartments 20 the heated air serves to heat the U-shaped leading edges of the skins $a^{10}$ of the inner wing sections $a^5$ and thus either prevents the formation of ice on such edges or effects removal of ice from the edges by melting it. In connection with flight of the airplane A the air which impinges against and flows rearwards across the upper portions of the leading edges of the outer skins $a^{10}$ of the inner wing sections $a^5$ passes the holes 28 and produces by aspiration a negative pressure or suction which results in an effective or efficient upflow of heated air through the compartments 20. The inner U-shaped skin parts 15 of the system portions 10 serve not only to define with the leading edges of the outer skins $a^{10}$ the compartments 20, but also to reenforce such edges.

The ducts 18 are connected to the innermost cross partitions 17 and lead or extend forwards as shown in Figure 1. They include heat exchangers 29 and serve to introduce heated air into the plenum chambers 23. The front portions of the ducts 18 extend through the nacelles $a^{19}$ for the inboard engines $a^2$ and have open scoop type ends which are located directly behind the propellers that are driven by the engines $a^2$. The heat exchangers 29 comprise casings 30 which are connected to, and form a part of, the ducts 18 and are adapted to have air pass therethrough. In addition to the casings 30 the heat exchangers 29 comprise front headers 31, rear headers 32, and tubes 33 between the two headers. The front headers 31 are connected to the rear ends of, and are adapted to receive exhaust gases from, the exhaust pipes $a^{18}$ for the inboard engines $a^2$. The tubes 33 are connected to, and establish communication between, the headers 31 and 32 and extend across the interiors of the casings 30. When the airplane A is in flight the exhaust gases from the engines $a^2$ flow successively through the headers 31, the tubes 33 and the headers 32 and serve to heat the air that passes through the casings 30. The rear headers 32 of the heat exchangers are provided with discharge pipes 34 for the exhaust gases. The portions of the ducts 18 that are between the heat exchanger casings 30 and the plenum chambers 23 are provided with branches 35 which lead to atmosphere. Flap valves 36 under control of the pilot of the airplane A are pivotally mounted in the ducts 18 adjacent the branches 35. Such valves are so arranged that when they are swung in one direction they close the branches 35 and result in the heated air being delivered into the plenum chambers for subsequent passage through the U-shaped compartments 20 and when they are swung in the opposite direction they block the discharge ends of the ducts and cause the air that is heated by the heat exchangers 29 to be discharged to atmosphere. When it is desired to render operative the system portions 10 for preventing formation of ice on, or effecting removal of ice from, the leading edges of the inner wing sections $a^5$ the flap valves 35 are swung so as to close the branches 35. When the valves are so swung the air which enters the open front ends of the ducts 18 flows through the ducts into the plenum chambers 23 and is heated as it passes the tubes 33 of the heat exchangers 29. After the heated air passes through the plenum chambers it flows upwards and around the U-shaped compartments 20 as hereinbefore described, and serves to heat the front or leading edges of the outer skins $a^{10}$ of the inner wing sections $a^5$. When it is desired to render the system portions 10 ineffective as in the case of the airplane A not encountering icing conditions in connection with flight thereof the flap valves 36 are swung so as to block the discharge ends of the ducts 18 and open the branches 35. By including the branches 35 and the flap valves 36 as parts of the ducts 18 air circulates through the heat exchanger casings 30 at all times during operation of the airplane A and hence there is little, if any, likelihood of the heat exchangers 29 becoming damaged as the result of over heating.

The system portions 11 for preventing ice formation on, or effecting removal of ice from, the leading edges of the outer wing sections $a^6$ and the leading edges of the ailerons $a^{14}$ comprise inner skin parts 37, longitudinally extending partitions 38, cross partitions 39, and air ducts 40. The inner skin parts 37 are U-shaped in cross section and fit within, and extend lengthwise of, the front or leading edges of the outer skins $a^{13}$ of the outer wing sections. They are formed of sheet metal and have throughout substantially the entire area thereof integral outstruck cup-like protuberances 37a, the outer portions of which are flat and abut against the inner surfaces of the leading edges of the outer skins $a^{13}$. Said protuberances serve to space the inner skin parts 37 from said leading edges of the outer skins $a^{13}$ so as to form therebetween thin compartments 41 of U-shaped cross section. The upper and lower side portions of the compartments 41 are open, as shown in Figure 4. The upper side margins of the inner skin parts 37 are bent downwards to form flanges 42 and the lower side margins of said inner skin parts are bent upwards to form flanges 43. The partitions 38 extend substantially vertically and are disposed in front of the front longitudinally extending spars $a^{11}$ of the outer wing sections $a^6$. They define with the inner skin parts 37 plenum chambers 44 and have the upper margins thereof suitably connected to the flanges 42. The lower margins of the partitions 38 are suitably connected to the flanges 43 on the lower side margins of the inner skin parts 37. The plenum chambers 44 receive heated air from the air ducts 40. The cross partitions 39 are connected to, and extend across, the end margins of the inner skin parts 37 and the longitudinally extendng partitions 38 and serve to close the ends of the U-shaped compartments 41 and the plenum chambers 44. The heated air which is supplied or delivered to the plenum chambers is introduced into the front central portions of the compartments 41 by way of holes 45 in the front central portions of the inner skin parts 37. The holes 45 in each inner skin part 37 are spaced closely together and are arranged in a longitudinally extending series. The heated air that is introduced into the plenum chambers 44 via the ducts 40 flows first forwards through the holes 45, then a portion travels upwards around the upper portions of the compartments 41, and the balance or remainder flows downwards and rearwards around the lower portions of said compartments. During travel or flow through the compartments 41 the heated air serves to heat the U-shaped leading edges of the outer skins $a^{13}$ and thus either prevents formation of ice on such edges, or effects removal of ice from the edges by melting it. The heated air after flowing through the compartments 41 passes into the spaces between the longitudinally extending partitions 38 and the front spars 11a of the outer wing sections $a^6$. From such spaces the heated air flows rearwards through holes 46 in the central portions of the front spars $a^{11}$, then rearwards through the spaces between the front spars and the rear spars $a^{11}$ and $a^{12}$, then through holes 47 in the central portions of the rear spars $a^{12}$ and then against the leading edges of the ailerons $a^{14}$. As shown in the drawings, the holes 46 extend from the outer ends of the front spars $a^{11}$ to the inner ends and the holes 47 extend from the outer ends of the spars $a^{12}$ to the inner ends of such spars. By reason of the fact that the holes 47 are located in the central portion of the rear spars $a^{12}$ the heated air after passing through the space between the front and rear spars $a^{11}$ and $a^{12}$ is directed against the central portions of the leading edges of the ailerons $a^{14}$ and hence a portion thereof flows upwards and the remainder flows downwards to the end that the entire leading edges of the ailerons are encompassed by heated air for ice eliminating purposes.

The ducts 40 are connected to the innermost cross partitions 39 and extend forwards, as shown in Figure 1. They include heat exchangers 48 and serve to introduce heated air into the plenum chambers 44. The front portions of the ducts 40 extend through the nacelles $a^{21}$ for the outboard engines $a^3$ and have open scoop type ends which are located or disposed directly behind the propellers that are driven by said engines $a^3$. The heat exchangers 48 are the same in design as the heat exchanges 29 and comprise casings which are connected to, and form a part of, the ducts 40 and are adapted to have air pass therethrough. In addition to the casings the heat exchangers 48 comprise front headers, rear headers and tubes between the two headers. The front headers are connected to the rear ends of, and are adapted to receive exhaust gases from, the exhaust pipes $a^{20}$ for the outboard engines $a^3$. The tubes of the heat exchangers 48 are connected to, and establish communication between, the front and rear headers and extend across the interiors of the heat exchanger casings. When the airplane A is in flight the exhaust gases from the outboard engines flow successively through the front headers, the tubes and the rear headers of the heat exchangers 48 and serve to heat the air that passes through the ducts 40. The portions of the ducts that are between the heat exchangers and the plenum chambers 44 are provided with branches 49 which lead to atmosphere. Flap valves (not shown) under control of the pilot of the airplane A are pivotally mounted in the ducts 40 adjacent the branches 49 and are so arranged that they are capable of being swung back and forth between a position wherein they close the branches 49 and result in the heated air being delivered to the plenum chambers 44 for subsequent passage through the U-shaped compartments 41 and a position wherein they block the discharge ends of the ducts 40 and cause the air that is heated by the heat exchangers 48 to be discharged to atmosphere. When it is desired to render operative the system portions 11 for preventing formation of ice on, or effecting removal of ice from, the leading edges of the outer wing sections $a^6$ and the leading edges of the ailerons $a^{14}$ the flap valves in the ducts 40 are swung so as to close the branches 49. The air which enters the open front ends of the ducts 49 flows through heat exchangers 48 where it is heated and thence flows into the plenum chambers 44. As heretofore pointed out the heated air after passing through the plenum chambers flows into the front central portions of the compartments 41 and then flows rearwards around the compartments. After flowing rearwards around the compartments the heated air flows successively through the holes 46 in the front spars $a^{11}$, the space between the front and rear spars $a^{11}$ and $a^{12}$, and the holes 47 in the rear spars $a^{12}$ and finally impinges against the leading edges of the ailerons $a^{14}$.

The system portions 12 for preventing formation of ice on the leading edges of the wing tips $a^7$ comprise inner skin parts 50 which are U-shaped in cross section and fit within, and extend lengthwise of, the leading edges of the external skins $a^{17}$. Said inner skin parts 50 are formed of sheet metal and extend around, and are suitably secured to the nose ribs $a^{16}$ in front of the spars $a^{15}$. They have throughout substantially the entire area thereof integral cup-like protuberances 51 which have the outer portions thereof flattened and arranged in abutment with the inner surfaces of the leading edges of the skins $a^{17}$ and serve to space the inner skin parts 50 from such edges so as to form therebetween thin compartments 52 of U-shaped cross section. The upper side portions of the compartments 52 are closed by flanges 53 on the upper side margins of the inner U-shaped skin parts 50 and the lower side portions of said compartments are closed by flanges 54 on the lower side margins of said inner skin parts 50. The spaces within the inner skin parts 50 constitute or form plenum chambers 55 and these are adapted to receive heated air from the outer ends of the plenum chambers 44 by way of holes 56 in the outermost cross partitions 39 and registering holes 57 in the nose ribs $a^{16}$ of the wing tips $a^7$. The portions of the inner U-shaped skin parts 50 that are disposed directly in front of the flanges 54 are each provided with a longitudinally extending series of holes 58. Such holes establish communication between the plenum chambers 55 and the lower rear portions of the U-shaped compartments 52. The portions of the outer skins $a^{17}$ that are disposed directly in front of the flanges 53 along the upper side portions of the inner skin parts 50 are each provided with a longitudinally extending series of holes 59. Such holes serve to vent to atmosphere the upper rear portions of the compartments 52. When heated air is introduced into the plenum chambers 55 it flows first through such chambers, then flows downwards through the holes 58 into the lower portions of the compartments 52, then flows forwards, upwards and rearwards around said compartments and is finally exhausted to atmosphere by way of the holes 59. During travel around the compartments 52 the heated air serves to heat the U-shaped leading edges of the skins $a^{17}$ of the wing tips $a^7$ and thus either prevents the formation of ice on such edges or effects removal of ice by melting it. In connection with flight of the airplane A the air which impinges against and flows rearwards across the upper portions of the leading edges of the external skins $a^{17}$ passes the holes 59 and by aspiration or a jet action produces a negative pressure or suction which results in an effective upflow of heated air through the compartments 52. The inner skin parts 50 serve to reenforce the leading edges of the external skins $a^{17}$ of the wing tips $a^7$.

The system portion 13 for preventing or eliminating ice formation on the leading edge of the horizontal stabilizer $a^{22}$ comprises an inner skin part 60 and a duct 61. The inner skin part 60 is of U-shaped cross section and fits within and extends lengthwise of, the leading edge of the external skin $a^{26}$ of the horizontal stabilizer. It is formed of sheet metal and has throughout substantially the entire area thereof integral outstruck cup-like protuberances 62 which have the outer portions thereof flattened and arranged in abutment with the leading surfaces of the leading edge of the skin $a^{26}$, and serve to space the inner skin part 60 from said edge so as to form therebetween a thin compartment 63 of U-shaped cross section. The upper side margin of the inner skin part 60 embodies a flange 64 which fits against, and is secured to, the superjacent portion of the external skin $a^{26}$. The lower side margin of the inner skin part 60 embodies a downwardly and rearwardly extending flange structure 65 and this fits against, and is secured to, the subjacent portion of the skin $a^{26}$, as shown in Figure 6. The front spar $a^{25}$ of the horizontal stabilizer is imperforate and defines with the inner U-shaped skin part 60 a plenum chamber 66 to which heated air is supplied or delivered by way of the duct 61. The front central portion of the inner skin part 60 embodies a longitudinally extending series of spaced apart holes 67 for permitting the heated air to flow or pass from the chamber 66 into the front central portion of the compartment 63. In order to provide for ready flow of heated air through the compartment 63 the portion of the external skin $a^{26}$ that is directly in front of the flange 64 is provided with a longitudinally extending series of holes 68 and the portion of said external skin that is directly in front of the flange formation 65 is provided with a longitudinally extending series of spaced apart holes 69. When the system portion 13 is in operation the heated air after travelling through the plenum chamber 66, flows into the front central portion of the compartment 63 via the holes 67 and then a portion of the air flows upwards and rearwards through the upper portion of the chamber and is discharged to atmosphere by way of the holes 68 and the remainder of the heated air flows downwards and rearwards through the lower portion of the compartment 63 and is discharged to atmosphere via the holes 69. The outside air which impinges against the leading edge of the external skin of the horizontal stabilizer and then flows past the holes 68 and 69 causes development or creation of suction at the holes 68 and 69 and hence results in a ready or efficient flow of heated air through the thin U-shaped compartment 63.

The duct 61 is located in, and extends lengthwise of, the plenum chamber 66 and is supported in any suitable manner. It embodies in the front portion thereof a longitudinal series of spaced apart holes 70 and receives heated air by way of a conduit 71 which, as shown in Figure 1, extends longitudinally through the fuselage $a$ of the airplane A. The rear end of the conduit 71 is connected to the central portion of the duct 61 and the front end of the conduit is connected to the discharge ends of the ducts 18 by way of branch conduits 72. When the flap valves 36 in the ducts 18 are swung or positioned so as to close the branch ducts 35 a portion of the air which is heated by the heat exchangers 29 is delivered to the duct 61 via the branch conduits 72 and the conduit 71. The portions of the duct 61 that define the holes 70 are inwardly deflected to form scoops 73 which face toward the central portion of the duct 61.

The system portions 14 for preventing or eliminating ice formation on the leading edges of the vertical stabilizers $a^{23}$ of the airplane empennage $a^4$ comprise inner C-shaped skin parts 74 and C-shaped ducts 75. The skin parts 74 are formed of sheet metal and extend around the C-shaped spars $a^{28}$ of the stabilizers $a^{22}$. They are of U-shaped cross section and fit within, and are shaped conformably to, the leading edges of the external skins $a^{29}$. Throughout substantially their entire area the inner skin parts 74 are provided with integral cup-like protuberances 76 and these have flattened outer portions and are in abutment with the inner surfaces of the external skins $a^{29}$ and serves so to space the parts 74 from said edges as to form thin C-shaped compartments 77 therebetween. Such compartments are of U-shaped cross section as shown in Figure 7. The inner skin parts 74 define with the C-shaped spars $a^{28}$ of the vertical stabilizers $a^{23}$ plenum chambers 78 and these receive heated air from the ducts 75. The side margins of the inner skin parts 74 are provided with outwardly and rearwardly extending flange formations 79 which abut against, and are suitably secured to, the adjacent portions of the leading edges of the vertical stabilizers $a^{23}$. The central portions of the C-shaped compartments 77 communicate with the plenum chambers 78 by way of holes 80 in the central portions of the inner skin parts 74. Said compartments 77 are vented to atmosphere by way of C-shaped series of holes 81 in the leading edges of the external skins $a^{29}$. The holes 81 are positioned directly ahead of the flange formations 79. The heated air which is delivered to the plenum chamber 78, after flowing therethrough, flows forwards into the compartments 77 via the holes 80, then is directed rearwards in divided streams which, after travelling through the heating compartments 77, are vented to atmosphere via the holes 81. Such holes, because of their arrangement with respect to the slip stream of the airplane A, are subjected to suction or a negative pressure with the result that the heated air is caused freely to flow through the compartments 77. The C-shaped ducts 75 within the plenum chambers 78 are provided with longitudinally extending series of holes 82 and have the central portions thereof connected to, and in communication with, the ends of the duct 61 in the leading edge of the horizontal stabilizer $a^{22}$. The portions of the conduits 75 which define the holes 82 are inwardly deflected to form scoops 83 which face toward the central portions of the ducts. When the system is in operation a portion of the air that is heated by the heat exchangers 29 and delivered to the duct 61 of the system portion 13 is introduced into the ducts 75 and then after flowing through the plenum chambers 78 enters the C-shaped compartments 77 via the holes 80. After entering the chamber 77 the heated air is discharged to atmosphere via the holes 81, as hereinbefore described.

The herein described anti-icing system effectively and efficiently fulfills its intended purpose and is essentially simple in design. It provides for quick elimination of ice from the leading edges of the main airfoils of the airplane A and entails no expense whatsoever in connection with operation thereof. In addition to providing for the desired elimination of ice the system affords reenforcement for the leading edges of the airplane airfoils. The outer ends of the outstruck protuberances on the inner skin parts of the system are preferably spot welded to the adjacent portions of the external skins of the airplane surfaces, it being understood that the latter skins, like the inner skin parts, are formed of sheet metal.

The invention is not to be understood as restricted to the details set forth since these may be modified within the scope of the appended claim without departing from the spirit and scope of the invention.

Having thus described the invention what I claim as new and desire to secure by Letters Patent is:

In combination with an airplane having a section of the wing thereof embodying front and rear spaced apart longitudinally extending spars and a covering skin around the spars, and provided with an aileron with the leading edge thereof positioned directly behind, and extending lengthwise of, the rear spar, an anti-icing system for the airplane comprising an elongated inner skin part extending lengthwise within, and shaped substantially conformably to, the leading edge of said section of the wing and spaced from said leading edge so as to form therebetween a comparatively thin compartment of arcuate cross section and with the upper and lower side portions opening within said leading edge, means arranged in associated relation with the skin part and forming therewith an interiorly disposed plenum chamber, means for delivering a fluid heating medium into the plenum chamber, means in the form of a longitudinal series of holes in the central portion of the inner skin part for supplying the heating medium from the plenum chamber into the compartment for transverse circulation in opposite directions therethrough, and means for delivering said heating medium to the leading edge of the aileron after flow thereof through said compartment consisting of a longitudinal series of transverse holes in the central portion of the front spar and a longitudinal series of transverse holes in the central portion of the rear spar.

HOWARD F. SCHMIDT.

REFERENCES CITED

The following references are of record in the file of this patent:

UNITED STATES PATENTS

| Number | Name | Date |
| --- | --- | --- |
| 1,797,160 | Spencer | Mar. 17, 1931 |
| 1,827,276 | Alfaro | Oct. 13, 1931 |
| 1,970,565 | Kean | Aug. 21, 1934 |
| 2,046,521 | Mahaffey | July 7, 1936 |
| 2,200,838 | Field | May 14, 1940 |
| 2,256,393 | Klein | Sept. 16, 1941 |
| 2,330,219 | Kemmer | Sept. 28, 1943 |
| 2,374,441 | Loufek | Apr. 24, 1945 |
| 2,379,183 | Price | June 26, 1945 |

FOREIGN PATENTS

| Number | Country | Date |
| --- | --- | --- |
| 97,141 | Sweden | Oct. 17, 1939 |